United States Patent [19]
Canada

[11] Patent Number: 6,061,986
[45] Date of Patent: May 16, 2000

[54] REINFORCED STUCCO PANEL AND STRAW INSULATOR WALL ASSEMBLY

[76] Inventor: Larry Canada, P.O. Box 326, Cascade, Mont. 59421

[21] Appl. No.: 09/148,031

[22] Filed: Sep. 3, 1998

Related U.S. Application Data

[60] Provisional application No. 60/084,497, May 6, 1998.

[51] Int. Cl.⁷ .................................................. E04B 1/02
[52] U.S. Cl. .................. 52/561; 52/DIG. 9; 52/293.3; 52/446; 52/454; 52/565
[58] Field of Search ............................ 52/DIG. 9, 293.3, 52/293.2, 503, 565, 561, 454, 444, 446, 169.11, 169.14, 300, 406.2

[56] References Cited

U.S. PATENT DOCUMENTS

| | | |
|---|---|---|
| 225,065 | 3/1880 | Leeds . |
| 312,375 | 2/1885 | Orr . |
| 565,175 | 8/1896 | McGlashan ..................... 52/DIG. 9 X |
| 801,361 | 10/1905 | Clayton et al. . |
| 1,084,967 | 1/1914 | Rosenleaf ......................... 52/293.2 X |
| 1,402,593 | 1/1922 | Gauvin . |
| 1,450,724 | 4/1923 | Hewlett ................................. 52/444 X |
| 1,604,097 | 10/1926 | Hewlett . |
| 1,633,702 | 6/1927 | Hewlett et al. . |
| 2,669,114 | 2/1954 | Mills ........................................ 52/454 |
| 3,653,170 | 4/1972 | Sheckler ............................... 52/565 X |
| 4,028,860 | 6/1977 | Hope et al. ............................... 52/565 |
| 4,524,553 | 6/1985 | Hacker ................................. 52/169.11 |
| 4,683,692 | 8/1987 | Tetschner ............................ 52/169.11 |
| 4,726,567 | 2/1988 | Greenberg ......................... 52/293.2 X |
| 5,287,674 | 2/1994 | Sperber ................................ 52/742.13 |
| 5,398,472 | 3/1995 | Eickelkraut . |
| 5,556,682 | 9/1996 | Gavin et al. ....................... 52/406.2 X |
| 5,685,116 | 11/1997 | Bradshaw et al. ................... 52/454 X |
| 5,878,544 | 3/1999 | McKinnon ........................ 52/293.2 X |
| 5,937,588 | 8/1999 | Gard ................................. 52/DIG. 9 X |

FOREIGN PATENT DOCUMENTS

| | | |
|---|---|---|
| 484419 | 1/1952 | Canada . |
| 1123874 | 10/1956 | France ................................... 52/293.1 |
| WO91/105928 | 5/1991 | WIPO . |

OTHER PUBLICATIONS

Sage Magazine "Splendor Out of Grass", L. Linthicum, Aug. 2, 1992, p. 14.

The New Mexican, "Bricks of Bales, Walls of Straw", G. Fauntleroy, 2 pages.

*Primary Examiner*—Beth A. Stephan
*Assistant Examiner*—Brian E. Glessner
*Attorney, Agent, or Firm*—Flanagan & Flanagan; John K. Flanagan; John R. Flanagan

[57] ABSTRACT

A reinforced stucco panel and straw insulator wall assembly includes a plurality of straw bales, a vertical column of rigid material, a layer of fabric, a plurality of screens, a footing section, a bond-beam form and a layer of reinforced mortar. The straw bales are stacked. The column includes concrete and a reinforcement rod. The concrete fills aligned vertical channels of the straw bales. The reinforcement rod is disposed in the channels and embedded by the concrete. The fabric of a substantially air-permeable material is attached to the stacked straw bales and disposed on vertical sides of the straw bales forming exterior and interior surfaces of the building employing the wall assembly. Each screen overlies and caps a top end of one of the straw bales and intersects the channels and defines an opening aligned with the channels and allows passage of the reinforcement rod. The layer of reinforced mortar includes a layer of reinforcing screen netting attached to ends of the screens projecting from between the bales. The footing section includes a slab of concrete and a stub rod. The stub rod is embedded by the concrete of the column and footing section. The assembly also includes a vertical pressure treated board, a vertical foam insulation board and a pair of upper and lower horizontal tie boards which function with the footing section to support the wall assembly. The bond-beam form secures the wall assembly.

27 Claims, 2 Drawing Sheets

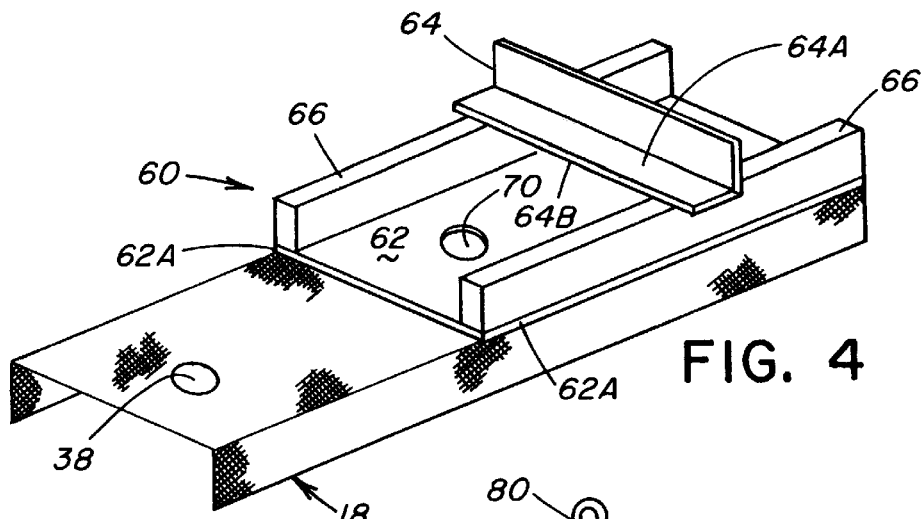
FIG. 4
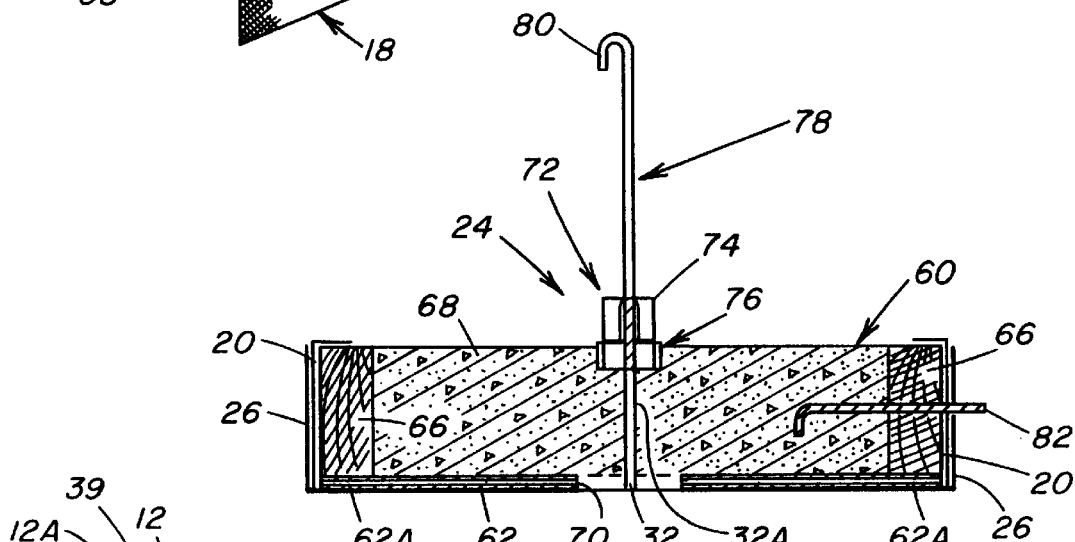
FIG. 5
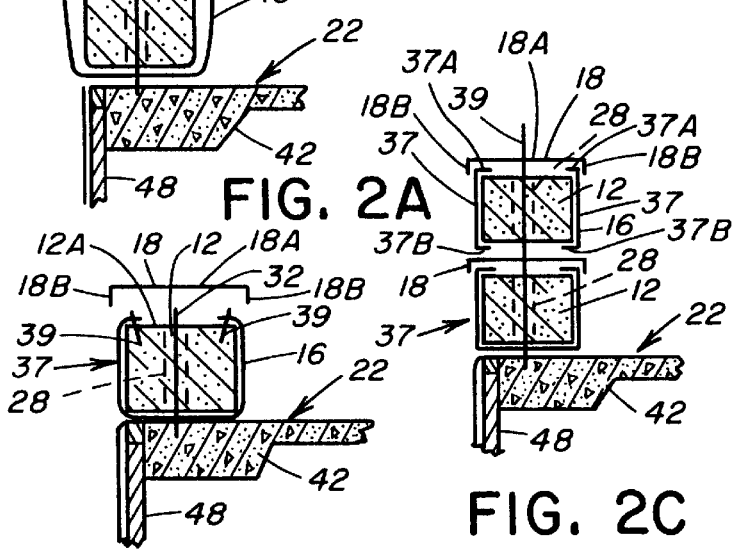
FIG. 2A
FIG. 2B
FIG. 2C
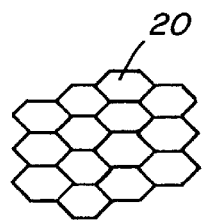
FIG. 3

REINFORCED STUCCO PANEL AND STRAW INSULATOR WALL ASSEMBLY

This application claims the benefit of U.S. provisional application No. 60/084,497, filed May 6, 1998.

BACKGROUND OF THE INVENTION

1. Field of the Invention

The present invention generally relates to building constructions and, more particularly, is concerned with a reinforced stucco panel and straw insulator wall assembly.

2. Description of the Prior Art

Straw is the tubular stem of harvested grains, such as wheat, barley, rice and oats. Straw is considered a waste product and in many areas is left in a field and burned. Since the early part of this century, many individuals have attempted to use straw as a source of building material because straw bales have efficient insulating qualities and because straw is so readily available as a waste product. The use of straw is also an environmentally sound alternative to the use of trees as a source of building materials. Straw bales, however, have been used with limited success.

A typical wall section employs a series of horizontally aligned straw bales which are stacked vertically to a certain height and are covered with a coating of stucco mortar, which is comprised of water, lime, cement and sand. The stucco mortar bonds to the straw bale. This coupling reduces the tendency of the stucco to flex as the straw bale coupling effectively increases the overall thickness of the stucco. Tests in laboratories show that straw supports a loading of 2.43 pounds per square inch, whereas stucco has a compressive strength of 2,000 pounds per square inch. Straw alone is easily compressible and therefore limited in its use to load bearing wall systems and limited in wall height to single story buildings. Walls constructed with stucco, however, are semi-rigid and offer little resistance to compression, torque loading or lateral shear.

A failing of past structures is due to moisture that enters the wall from numerous small fractures created by expansion and contraction cycles as the stucco surface is heated and cooled by atmospheric changes. Moisture that passes through the wall causes the straw to collapse and to decompose within the wall and this creates voids that sever the straw-stucco coupling and structurally weaken the wall. Large roof overhangs, which shade the wall and protect it from rain showers, is an accepted means for maintaining structural integrity, but does not eliminate the problem and limits the usefulness of this system of wall construction.

The foundation support for straw bale construction varies considerably from standard construction practices. The standard framed-construction procedures call for a 16-inch wide concrete footing below frost line which supports an 8-inch wide concrete stem wall which in turn supports an above-ground sheeted stud wall. Following this accepted practice where the stem wall provides full width support of the above-ground wall section, straw bale construction would require a minimum 18-inch wide stem wall extending below frost line. Use of monolithic slabs with a perimeter depth of 8 inches and a width of 18 inches or greater accommodates straw bale construction but is limited to use in warm climates where there is no danger of foundation failure which may result from frost heaving. In cold climates, insulation board may be placed radially around a building perimeter just below the soil surface as a means to insulate the soil from severe cold and prevent water from penetrating the soils near the building.

Representative examples of building constructions are disclosed in U.S. Pat. No. 1,604,097 to Hewlett and U.S. Pat. No. 5,398,472 to Eichelkraut. The Hewlett and Eichelkraut patents each disclose the use of straw bales as building blocks. While these and other prior art constructions appear to be satisfactory in use for the specific purposes for which they were designed, it is apparent from the above discussion that a more effective means still needs to be developed in using straw bales and stucco in building construction.

SUMMARY OF THE INVENTION

The present invention provides a reinforced stucco panel and straw insulator wall assembly designed to satisfy the aforementioned need. The reinforced stucco panel and straw insulator wall assembly of the present invention includes a reinforced, load-bearing stucco wall with a monolithic construction and structurally integrating a straw bale core surrounded by a breathable fabric membrane as an extension of a monolithic slab incorporating a vertically aligned frost barrier. Each course of straw bales is separated by expanded metal which has been formed into a channel and, when aligned both vertically and horizontally, is used for a screed point, assuring the trueness of the wall and tying the parallel but opposed wall sections together. Vertically positioned channels within the straw bales are filled with reinforced concrete which transfers the roof connection of the top plate and bond-beam to the monolithic slab and footing. The monolithic concrete slab uses pressure treated plywood panels or other impervious materials which are aligned vertically and extend below the slab and eliminate the need for wide footings and stem walls which extend below the frost line.

Increased structural strength is afforded by the post and beam type action of the stucco wall sections when interconnected by the expanded metal panels. Increased compression resistance is afforded by the vertically positioned concrete posts which support attachments to the bond-beam and top plate of the wall. Internal moisture is controlled by layering of a breathable fabric common to construction trades which allows vapors to pass from the straw bales and through the stucco but will not allow water droplets to pass through from the stucco into the straw. This allows moisture trapped within the straw bale before or during construction to pass freely from the straw bale and prevents accumulation of moisture at the thermal break created by the temperature differential between the straw and the stucco and eliminates the primary elements of decomposition and resultant wall failure of prior art.

The use of pressure-treated and foam-backed wood panels that extend vertically below the monolithic slab and below the frost line prevent the migration of soil moisture underneath the slab and therefore prevents any occurrence of frost heaving due to the freezing of any migrated soil moisture. The assembly reduces the amount of materials and labor required when compared to the standard building practice that requires a concrete footing and stem wall to extend below the frost line. The assembly makes practical the use of straw bales as a building material in both wet and dry and warm and cold climates. Also, the efficient R-42 insulating qualities of the straw bale and its availability as a waste product combined with properly designed housing is an environmentally sound alternative to the use of trees as a source of building materials. Such capability will solve aforementioned problems with the prior art designs.

Accordingly, the present invention is directed to a reinforced stucco panel and straw insulator wall assembly which comprises: (a) a plurality of straw bales stacked on top of one another, each of the stacked straw bales having opposite top and bottom ends and a plurality of vertical sides, the stacked straw bales defining a plurality of vertical channels horizontally spaced from and aligned with one another and extending between the top and bottom ends of the stacked straw bales; (b) a plurality of vertical columns of rigid material each disposed in one of the aligned vertical channels defined by the stacked straw bales; (c) a layer of fabric comprised of a substantially air-permeable material attached to the stacked straw bales and disposed on those of the vertical sides of the stacked straw bales forming at least an exterior surface of a building employing the wall assembly; (d) means for supporting on the ground the stacked straw bales and the vertical columns of rigid material; and (e) a layer of reinforced mortar disposed adjacent to the layer of fabric along those of the vertical sides of the stacked straw bales forming the exterior surface of the building employing the wall assembly. The wall assembly further comprises a plurality of screens of rigid material each overlying and capping the top end of one of the stacked straw bales and disposed between vertically adjacent ones and intersecting the aligned vertical channels of the stacked straw bales and defining an opening aligned with the aligned vertical channels of the stacked straw bales. Each screen has a substantially inverted U-shaped configuration and along an end thereof extending outward from between the stacked bales is attached to the layer of reinforced mortar.

More particularly, the vertical column of rigid material includes a vertical column of concrete filling the aligned vertical channels of the stacked straw bales. The vertical column of rigid material further includes a reinforcement rod having opposite upper and lower ends and disposed vertically in the vertical channels of the stacked straw bales and embedded by the concrete between the opposite upper and lower ends of the reinforcement rod. The layer of fabric also is disposed on and extends along those of the vertical sides of the stacked straw bales forming an interior surface of the building employing the wall assembly.

In addition to mortar, the layer of reinforced mortar of the wall assembly further comprises a layer of reinforcing screen netting extending between the top and bottom ends of the stacked straw bales adjacent the layer of fabric along those of the vertical sides of the stacked straw bales forming the exterior and interior surfaces of the building employing the wall assembly. The layer of reinforcing screen netting is attached to the ends of the screens extending outwardly from between the bales. The layer of mortar, which preferably is stucco, is attached on the reinforcing screen netting and also extends between the top and bottom ends of the stacked straw bales.

The supporting means includes a footing section of rigid material disposed in the ground. The footing section includes a slab of concrete disposed in the ground and a stub rod having opposite upper and lower ends and disposed vertically in the slab and the vertical channel of one of the stacked straw bales and embedded by the concrete of the vertical column and the concrete of the slab of the footing section between the opposite upper and lower ends of the stub rod. The supporting means also includes a vertical pressure treated board having opposite inner and outer sides, with the inner side being disposed adjacent to the footing section and the outer side of the vertical pressure treated board disposed in the same plane as an exterior surface of a building employing the wall assembly, and a vertical foam insulation board at an inner side disposed flush against the footing section and the ground and at an outer side mounted to the inner side of the vertical pressure treated board.

The wall assembly also includes means for securing the stacked straw bales and the vertical column of rigid material upon the supporting means. The securing means includes a bond-beam form having a bottom board mounted to the top end of a top one of the stacked straw bales and intersecting the aligned vertical channel of the top one stacked straw bale and defining an opening aligned with the aligned vertical channels of the stacked straw bales, and a body of concrete continuous with the vertical column of concrete of the vertical column of rigid material and disposed on top of the bottom board of the bond-beam form. The upper end of the reinforcement rod of the vertical column of rigid material extends through the body of concrete and the opening of the bottom board of the bond-beam form and is fastened upon the bond-beam form.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIGS. 2A to 2C are diagrammatic views showing steps in constructing the wall assembly.

FIG. 3 is a fragmentary plan view of a reinforcing screen netting of a layer of reinforced mortar of the wall assembly.

FIG. 4 is an enlarged perspective view of a screen and a bond-beam form of the reinforced stucco panel and straw insulator wall assembly.

FIG. 5 is an enlarged vertical cross-sectional view of an upper end of the wall assembly.

DETAILED DESCRIPTION OF THE INVENTION

Figure 1:
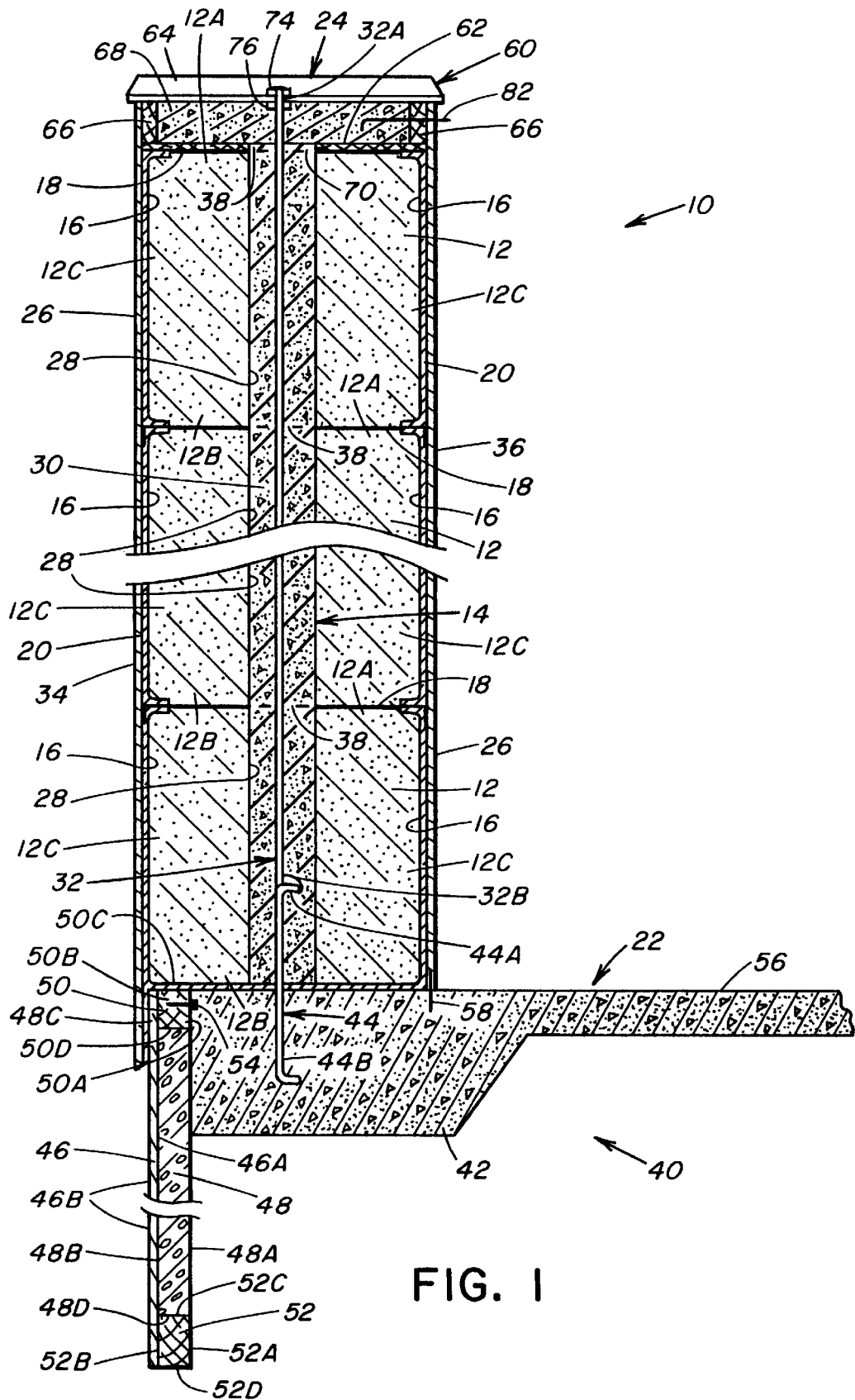
FIG. 1 is a vertical cross-sectional view of a reinforced stucco panel and straw insulator wall assembly of the present invention.

Referring to the drawings and particularly to FIG. 1, there is illustrated a reinforced stucco panel and straw insulator wall assembly, generally designated 10, of the present invention. Basically, a typical section of the reinforced stucco panel and straw insulator wall assembly 10 includes a plurality of straw bales 12, a vertical column of rigid material 14, a layer of fabric 16, a plurality of screens 18, a layer of reinforced mortar 26 with a layer of reinforcing screen netting 20, a supporting means 22 and a securing means 24. The wall assembly 10 may be used in a one-floor building or in a multiple-floor building.

The plurality of straw bales 12 of the wall assembly 10 are stacked on top of one another. Each stacked straw bale 12 has opposite top and bottom ends 12A, 12B and a plurality of vertical sides 12C. Each stacked straw bale 12 has a vertical channel 28 formed therethrough extending between the top and bottom ends 12A, 12B and aligned with the vertical channels 28 of vertically adjacent ones of the stacked straw bales 12. The straw bales 12 may be utilized in any suitable number depending upon the height and length of the wall of a building. The straw may be the tubular stem of any suitable harvested grain, such as wheat, barley, rice and oats. Each straw bale 12 has a substantially rectangular configuration, though may have other suitable shapes, and may have any suitable size depending upon the structural requirements of the building. The vertical channel 28 is disposed centrally through the straw bale 12 and preferably has a substantially circular configuration in transverse cross-section, though may have any other suitable shape. The vertical channel 28 can have a diameter less than half of a horizontal width of the straw bale 12, though may have any other suitable size.

The vertical column of rigid material 14 of the wall assembly 10 includes a vertical column of concrete 30 and a reinforcement rod 32. The vertical column of concrete 30 fills the aligned vertical channels 28 of the stacked straw bales 12. The reinforcement rod 32 has opposite upper and lower ends 32A, 32B and is disposed vertically in the vertical channels 28 of the stacked straw bales 12 and embedded by the concrete 30 between the opposite upper and lower ends 32A, 23B of the reinforcement rod 32. The reinforcement rod 32 is particularly disposed centrally in the vertical channels 28 of the straw bales 12. The concrete 30 is poured around and embeds the reinforcement rod 32. The lower end 32B of the reinforcement rod 32 has a hook-shaped configuration while the upper end 32A is externally threaded. The lower end 32B is disposed within the vertical channel 26 of a lowest of the straw bales 12. The reinforcement rod 32 is comprised of a substantially rigid metal material.

The layer of fabric 16 of the wall assembly 10 is comprised of a substantially air-permeable material and is attached to the stacked straw bales 12 and disposed adjacent to those of the vertical sides 12C of the stacked straw bales 12 forming at least an exterior surface 34 of the building employing the wall assembly 10. Preferably, the layer of fabric 16 is also disposed adjacent to those of the vertical sides 12C of the stacked straw bales 12 forming an interior surface 36 of the building employing the wall assembly 10. The layer of fabric 16 is formed by pieces 37 of cut fabric with each piece of fabric being cut about six inches wider than one of the straw bales 12.

Referring now to FIGS. 1, 2A to 2C and 4, each screen 18 of the wall assembly 10 is comprised of an expanded metal material. Each screen 18 has a substantially inverted U-shaped configuration, as shown in FIG. 4, and includes a flat main portion 18A overlying and capping a top end 12A of one of the straw bales 12 and disposed between vertically adjacent straw bales 12 and intersecting the aligned vertical channels 28 of the straw bales 12 and the vertical columns of concrete 30 filling the vertical channels 28. The main portion 18A of each screen 18 defines an opening 38 aligned with the aligned vertical channels 28 of the straw bales 12. The opening 38 of the main portion 18A of each screen 18 allows passage therethrough of the vertically-extending reinforcement rod 32. The main portion 18A of each screen 18 also overlies upper and lower opposite edge portions 37A, 37B of the adjacent pieces 37 of fabric 16 where they are pinned at 39 to the straw bales 12. The vertical channels 28 receive the concrete therein. The concrete flows through the portion of each screen 18 surrounding the opening 38, as shown in FIG. 1, in forming the continuous column 30 of concrete. The opening 38 of each screen 18 has a diameter which is substantially smaller than the diameter of the vertical channel 28 such that the portion of each screen 18 surrounding the opening 38 is embedded in the concrete of the column 30. Each screen 18 also includes a pair of opposite side portions 18B attached to and extending downwardly from opposite edges of the flat main portion 18A thereof so as to extend vertically along portions of opposite vertical sides of the stacked straw bales 12.

Each layer of reinforcing screen netting 20 of the layer of reinforced mortar extends between the top and bottom ends 12A, 12B of the stacked straw bales 12 and is attached to the respective ends of the screens 18 along those of the vertical sides 12C of the stacked straw bales 12 forming the exterior and interior surfaces 34, 36 of the building employing the wall assembly 10. As seen in FIG. 3, each layer of reinforcing screen netting 20, also well-known as "chicken wire", is comprised of a substantially pliable wire mesh-like metal material.

The supporting means 22 of the wall assembly 10 includes a footing section 40 of rigid material disposed in the ground below the building. The footing section 40 includes a slab 42 of concrete disposed in the ground. The footing section 40 also includes a stub rod 44. The stub rod 44 has opposite upper and lower ends 44A, 44B. The stub rod 44 is arranged vertically in the footing section 40 and in the vertical channel 28 of the lowest stacked straw bale 12 and is embedded by the concrete of the vertical column 14 and of the slab 42 of the footing section 40 between the opposite upper and lower ends 44A, 44B of the stub rod 44. The stub rod 44 is particularly at lower end 44B embedded by the concrete slab 42 of the footing section 40 and extends vertically upwardly therefrom such that the upper end 44A of the stub rod 44 and the lower end 32B of the reinforcement rod 32 are secured to one another within the vertical channel 28 of the lowest stacked straw bale 12. The upper end 44A of the stub rod 44 has a hook-shaped configuration corresponding to the lower end 32B of the reinforcement rod 32 such that the stub rod 44 and the reinforcement rod 32 are hooked to one another. The lower end 44B of the stub rod 44 also has a hook-shaped configuration so as to provide a more secure attachment within the concrete slab 42 of the footing section 40. The stub rod 44 is comprised of a substantially rigid metal material. The footing section 40 has any suitable size depending on the requirements of the building.

In constructing the wall assembly 10, as seen in FIG. 2A a piece 37 of cut fabric 16 is laid on top of the footing section 40 and a first row of straw bales 12 are set on top of the fabric 16. As shown in FIG. 2B, each piece of fabric 16 is lifted up and pinned at 39 to a top end 12A of a straw bale 12. A screen 18 is then placed over the bale 12 and pinned ends of the fabric piece 37 of 16. As depicted in FIG. 2C, another piece 37 of cut fabric 16 and row of straw bales 12 are then set on top of the screen 18. Each piece 37 of fabric 16 is positioned on a screen 18 and is pinned about three inches in from an edge of the straw bale 12. The piece 37 of fabric 16 is then pulled up and pinned to the top end 12A of this straw bale 12 after which another screen 18 is placed over the bale 12 and pinned ends of the piece 37 of fabric 16.

The supporting means 22 further includes a vertical pressure treated board 46, a vertical foam insulation board 48 and a pair of upper and lower horizontal tie boards 50, 52. The vertical pressure treated board 46 has opposite inner and outer sides 46A, 46B. The inner side 46A of the vertical pressure treated board 46 is disposed adjacent to the footing section 40. The outer side 46B of the vertical pressure treated board 46 is disposed in the same plane as the exterior surface 34 of the building employing the wall assembly 10. The vertical foam insulation board 48 has opposite inner and outer sides 48A, 48B and opposite top and bottom sides 48C, 48D. The inner side 48A of the vertical foam insulation board 48 is disposed flush against the footing section 40 and against the ground. The outer side 48B of the vertical foam insulation board 48 is mounted to the inner side 46A of the vertical pressure treated board 46. Each of the upper and lower horizontal tie boards 50, 52 has opposite inner and outer sides 50A, 50B and 52A, 52B and opposite top and bottom sides 50C, 50D and 52C, 52D. The upper horizontal tie board 50 at the top side 50C is disposed flush against the bottom end 12B of a bottom one of the stacked straw bales 12 and at the bottom side 50D is mounted to the top side 48C of the vertical foam insulation board 48 and at the inner side 50A is mounted to the footing section 40 and at the outer side 50B is mounted to the inner side 46A of the vertical pressure treated board 46. The lower horizontal tie board 52 at the top side 52C is mounted to the bottom side 48D of the vertical foam insulation board 48 and at the bottom side 52D is disposed against the ground and at the inner side 52A is disposed flush against the footing section 40 and at the outer side 52B is mounted to the inner side 46A of the vertical pressure treated board 46. The supporting means 22 also includes a coupler, such as a lag bolt 54, partially embedded by the concrete slab 42 of the footing section 40 and partially threaded into the upper horizontal tie board 50 for securing the upper and lower horizontal tie boards 50, 52, the vertical pressure treated board 46 and the vertical foam insulation board 48 to the footing section 40.

A trench is dug around a perimeter of the building to a depth greater than a local frost depth. The vertical pressure treated board 46, the vertical foam insulation board 48 and the upper and lower horizontal tie boards 50, 52 are disposed within the trench. A series of the boards 46, 48, 50 and 52 are disposed all around the building to create an exterior form for the concrete slab 42 of the footing section 40 with an inner monolith slab 56. The ground around the boards 46, 48, 50 and 52 is compacted and the necessary leveling is completed prior to pouring the concrete. The wall assembly 10 also includes narrow sections of expanded metal laths 58 which are positioned parallel with the interior surface 36 of the building below the stack of straw bales 12 and are embedded in the concrete slab 42 of the footing section 20. The wall assembly 10 also includes short sections of reinforcing stub rod 44 placed at measured intervals around the perimeter of the building.

Referring now to FIGS. 1, 4 and 5, the securing means 24 of the wall assembly 10 secures the stacked straw bales 12 and the vertical column of rigid material 14 upon the supporting means 22. The securing means 24 includes a bond-beam form 60. The bond-beam form 60 includes a bottom board 62, a bridge 64, a pair of opposite side boards 66 and a body 68 of concrete. The bottom board 62 has opposite edge portions 62A and is mounted to the top end 12A of a top one of the stacked straw bales 12. The bottom board 62 intersects the aligned vertical channel 28 of the top one stacked straw bale 12. The bottom board 62 defines an opening 70 aligned with the aligned vertical channels 28 of the stacked straw bales 12. The bridge 64 has opposite top and bottom sides 64A, 64B. The pair of opposite side boards 66 are fixed along the opposite edge portions 62A of the bottom board 62 and support the bridge 64 in spaced relation above the bottom board 62. The bridge 64 extends between tops of the side boards 66. The concrete for forming the vertical column 30 and body 68 are poured after the bond board 60 is placed on the uppermost screen 18, compressed downward against the straw bales 12 and fastened in place. Thus, the body 68 of concrete is continuous with, but wider than, the vertical column 30 of concrete of the vertical column of rigid material 14 and is substantially enclosed by the bottom board 62, the bridge 64 and the opposite side boards 66. The bottom board 62, the bridge 64 and the opposite side boards 66 all together have a substantially rectangular configuration.

The upper end 32A of the reinforcement rod 32 of the vertical column of rigid material 14 extends through the body 30 of concrete and the opening 70 of the bottom board 62 of the bond-beam form 60. The securing means 24 further includes a fastener 72. The fastener 72 includes an internally threaded nut 74 and an internally threaded washer 76. The nut 74 is disposed adjacent to the top side 64A of the bridge 64 of the bond-beam form 60. The nut 74 threadably receives the upper end 32A of the reinforcement rod 32. The washer 76 is disposed adjacent to the bottom side 64B of the bridge 64 of the bond-beam form 60. The washer 76 threadably receives the upper end 32A of the reinforcement rod 32. Before the concrete is poured, the nut 74 and washer 76 are initially tightened against the top and bottom sides 64A, 64B, respectively, of the bridge 64 of the bond-beam form 60. The nut 74 is untightenable and removable from the upper end 32A of the reinforcement rod 32 and thereby allows removal of the bridge 64 of the bond-beam form 60. The nut 74 is replaceable and retightenable on the upper end 32A of the reinforcement rod 32. The bottom board 62 of the bond-beam form 60 overlies a top one of the screens 18 such that the opening 70 in the bottom board 62 is aligned with the opening 38 of the top one screen 18. The reinforcement rod 32 may further extend beyond the upper threaded end 32A and be provided with an upper short section 78 with an upper end hook 80 for receiving a threaded connector (not shown) which attaches to an exposed portion of the threaded end 32A of the reinforcement rod 32 extending above the bond-beam form 60. The layers of reinforcing screen netting 20 are each attached to outer sides of the side boards 66 of the bond-beam form 60. One of the layers of reinforcing screen netting 20 is attached to the outer side 46B of the vertical pressure treated board 46. The layer of reinforcing screen netting 20 may also be attached to a metal lath 58 or to the footing section 40 itself. The wall assembly 10 also includes at least one anchor bolt 82 mounted to and extending outwardly from the bond-beam form 60 for attachment of header boards and floor joists (not shown) to the bond-beam form 60.

The layer of reinforced mortar 26 of the wall assembly 10 is disposed adjacent to the pieces 37 of fabric 16 along those of the vertical sides 12C of the stacked straw bales 12 forming the exterior surface 34 of the building employing the wall assembly 10. The layer of reinforced mortar 26 is also disposed adjacent to the pieces 37 of fabric 16 along those of the vertical sides 12C of the stacked straw bales 12 forming the interior surface 36 of the building employing the wall assembly 10. The layer of reinforced mortar 26 also extends between the top and bottom ends 12A, 12B of the stacked straw bales 12. The mortar of the reinforced layer 26 thereof preferably is stucco which is applied and attached to the layer of reinforcing screen netting 20. Attachment of the layers of reinforced mortar 26 to the opposite side portions 18B of the screens 18 ties the horizontal and vertical reinforcements together into a box-like structure. The mortar is applied in a manner common to the trade. Multiple story buildings are constructed using the same system as that employed for single story buildings.

In summary, there are at least three important features of the wall assembly 10 of the present invention described above. First is the construction components of the wall assembly 10 itself. The use of the U-shaped screens 18 to join the wall segments creates a strong box structure. The breathable fabric 16 protects the straw bales 12 from moisture. The vertically positioned concrete columns 30 transfer the overhead weight of the roof section directly to the footing section 40. Second is the use of the bond-beam form 60 as a method to preload the walls and compress the straw bales 12 to an equal height. The bond-beam forms 60 when joined with the vertical columns 14 permits multi-story construction and the attachment of floor sections to the wall. Third is the construction of the supporting means 22. The vertical-down extension of a non-permeable insulating barrier eliminates the need for deep footings and stem walls. This frost barrier is not limited in application to straw bale construction and is a practical alternative to standard construction practices that require footings and stem walls. The barrier itself may be comprised of any impervious material such as wood, recycled plastics or press board made of straw.

The vertical channels 28 may be located through the stacked straw bales 12 or between adjacent vertically stacked bales. The columns 14 of rigid material may take the form of sections of hollow rigid pipe. Thus, the sections of pipe may be disposed vertically through the stacked straw bales 12 or placed vertically at the ends of adjacent bales such that the bales are stacked between the vertical pipes.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A reinforced stucco panel and straw insulator wall assembly, comprising:
   (a) a plurality of straw bales stacked on top of one another, each of said stacked straw sales having opposite top and bottom ends and a plurality of vertical sides, said stacked straw bales defining a plurality of vertical channels horizontally spaced from and aligned with one another and extending between said top and bottom ends of said stacked straw bales;
   (b) a plurality of vertical columns of rigid material each disposed in one of said aligned vertical channels defined by said stacked straw bales;
   (c) a plurality of pieces of fabric each comprised of a substantially air-permeable material and having upper and lower edge portions disposed between and attached to vertically adjacent ones of said stacked straw bales such that said pieces of fabric are disposed on those of said vertical sides of said stacked straw bales forming at least an exterior surface of said wall assembly;
   (d) means for supporting said stacked straw bales and said vertical columns of rigid material;
   (e) a layer of reinforced mortar supported adjacent to said pieces of fabric along those of said vertical sides of said stacked straw bales forming said exterior surface of said wall assembly; and
   (f) a plurality of screens of substantially rigid material each overlying and capping said top end of one of said stacked straw bales and disposed between vertically adjacent ones of said stacked straw bales such that said screens intersect said vertical channels of said stacked straw bales and said vertical columns of rigid material disposed in said vertical channels and overlap said upper and lower edge portions of adjacent ones of said pieces of fabric so as to retain said edge portions between said vertically adjacent ones of said stacked straw bales.

2. The wall assembly of claim 1 wherein each of said vertical columns of rigid material includes a vertical column of concrete filling said aligned vertical channels of said stacked straw bales.

3. The wall assembly of claim 2 wherein each of said vertical columns of rigid material further includes a reinforcement rod having opposite upper and lower ends and disposed vertically in said vertical channels of said stacked straw bales and embedded by said concrete between said opposite upper and lower ends of said reinforcement rod.

4. The wall assembly of claim 2 wherein said supporting means includes a footing section of rigid material.

5. The wall assembly of claim 4 wherein said footing section of rigid material of said supporting means includes a slab of concrete.

6. The wall assembly of claim 5 wherein said footing section of rigid material of said supporting means includes a stub rod having opposite upper and lower ends and disposed vertically in said footing section of rigid material and in said vertical channel of one of said stacked straw bales and embedded by said concrete of said vertical column and said concrete of said slab of said footing section between said opposite upper and lower ends of said stub rod.

7. The wall assembly of claim 1 wherein said layer of reinforced mortar includes a layer of reinforcing screen netting and a layer of mortar applied on said reinforcing screen netting, said layer of reinforcing screen netting extending between said top and bottom ends of said stacked straw bales and along said pieces of fabric and those of said vertical sides of said stacked straw bales forming exterior and interior surfaces of said wall assembly.

8. The wall assembly of claim 7 wherein said layer of mortar is stucco.

9. The wall assembly of claim 7 wherein said layer of mortar on said reinforcing screen netting also extends between said top and bottom ends of said stacked straw bales.

10. A reinforced stucco panel and straw insulator wall assembly, comprising:
    (a) a plurality of straw bales stacked on top of one another, each of said stacked straw bales having opposite top and bottom ends and a plurality of vertical sides, said stacked straw bales defining a plurality of vertical channels horizontally spaced from and aligned with one another and extending through and between said top and bottom ends of said stacked straw bales;
    (b) a plurality of vertical columns of rigid material respectively disposed in and filling said aligned vertical channels of said stacked straw bales;
    (c) a plurality of screens of rigid material each having main portion overlying and capping said top end of one of said stacked straw bales and disposed between vertically adjacent ones and intersecting said vertical channels of said stacked straw bales and said vertical columns of rigid material in said vertical channels and having a pair of opposite side portions attached to and extending downwardly from opposite edges of said main portion so as to extend vertically along portions of said opposite vertical sides of said stacked straw bales;
    (d) means for supporting said stacked straw bales and said vertical column of rigid material; and
    (e) a layer of reinforced mortar attached to and extending along said vertical sides of said stacked straw bales forming an exterior surface of said wall assembly, said layer of reinforced mortar being attached to those of said opposite side portions of said screens extending vertically along portions of said vertical sides of said stacked straw bales forming said exterior surface of said wall assembly.

11. The wall assembly of claim 10 wherein each of said vertical columns of rigid material includes a vertical column of concrete filling one of said aligned vertical channels of said stacked straw bales and extending through said screens.

12. The wall assembly of claim wherein 11 each of said vertical columns of rigid material further includes a reinforcement rod having opposite upper and lower ends and disposed vertically in one of said vertical channels of said stacked straw bales and embedded by said concrete between said opposite upper and lower ends of said reinforcement rod and extending through said screens.

13. The wall assembly of claim 10 wherein each said screen has an inverted U-shaped configuration.

14. A reinforced stucco panel and straw insulator wall assembly, comprising:
   (a) a plurality of straw bales stacked on top of one another, each of said stacked straw bales having opposite top and bottom ends and a plurality of vertical sides, said stacked straw bales defining a plurality of vertical channels horizontally spaced from and aligned with one another and extending between said top and bottom ends of said stacked straw bales;
   (b) a plurality of vertical columns of rigid material each disposed in one of said aligned vertical channels defined by said stacked straw bales;
   (c) means for supporting said stacked straw bales and said vertical columns of rigid material, said supporting means including
      (i) a footing section of rigid material having a portion underlying and supporting said stacked straw bales and vertical columns of rigid material with a bottom of said portion spaced therebelow,
      (ii) a vertical pressure treated board underlying said stacked straw bales and having opposite inner and outer sides, said inner side of said vertical pressure treated board being disposed adjacent to said footing section and said outer side of said vertical pressure treated board being disposed in the same plane as those of said vertical sides of said stacked straw bales forming an exterior surface of said wall assembly, and
      (iii) a vertical foam insulation board underlying said stacked straw bales and extending downwardly beyond said bottom of said footing section, said vertical foam insulation board having opposite inner and outer sides and opposite top and bottom sides, said inner side of said vertical foam insulation board being disposed flush against said footing section and said outer side of said vertical foam insulation board being mounted to said inner side of said vertical pressure treated board; and
   (d) a layer of reinforced mortar supported along said vertical sides of said stacked straw bales forming said exterior surface of said wall assembly.

15. The wall assembly of claim 14 wherein said supporting means further includes:
   an upper horizontal tie board having opposite inner and outer sides and opposite top and bottom sides, said upper horizontal tie board at said top side thereof underlying said stacked straw bales and being disposed flush against said bottom end of a bottom one of said stacked straw bales and at said bottom side thereof mounted to said top side of said vertical foam insulation board and at said inner side thereof mounted to said footing section and at said outer side thereof mounted to said inner side of said vertical pressure treated board; and
   a lower horizontal tie board having opposite inner and outer sides and opposite top and bottom sides, said lower horizontal tie board at said top side thereof spaced below said stacked straw bales and being mounted to said bottom side of said vertical foam insulation board and at said inner side thereof disposed flush against said footing section and at said outer side thereof mounted to said inner side of said vertical pressure treated board.

16. The wall assembly of claim 14 wherein each of said vertical columns of rigid material includes a vertical column of concrete filling said aligned vertical channels of said stacked straw bales.

17. The wall assembly of claim 16 wherein each of said vertical columns of rigid material further includes a reinforcement rod having opposite upper and lower ends and disposed vertically in said vertical channels of said stacked straw bales and embedded by said concrete between said opposite upper and lower ends of said reinforcement rod.

18. The wall assembly of claim 14 wherein said footing section includes a slab of concrete.

19. The wall assembly of claim 18 wherein said supporting means further includes a coupler partially embedded by said slab of concrete of said footing section and partially threaded into said upper horizontal tie board of said supporting means for securing said upper and lower horizontal tie boards, said vertical pressure treated board and said vertical foam insulation board to said footing section.

20. The wall assembly of claim 18 wherein said footing section includes a stub rod having opposite upper and lower ends and disposed vertically in said footing section of rigid material and in said vertical channel of one of said stacked straw bales and embedded by said rigid material of said vertical column and said concrete of said slab of said footing section between said opposite upper and lower ends of said stub rod.

21. The wall assembly of claim 20 wherein:
   said lower end of said reinforcement rod of said vertical column of rigid material has a hook-shaped configuration; and
   said upper end of said stub rod of said footing section has a hook-shaped configuration corresponding to said lower end of said reinforcement rod of said vertical column of rigid material and such that said stub rod and said reinforcement rod are hooked to one another.

22. A reinforced stucco panel and straw insulator wall assembly, comprising:
   (a) a plurality of straw bales stacked on top of one another, each of said stacked straw bales having opposite top and bottom ends and a plurality of vertical sides, said stacked straw bales defining a plurality of vertical channels horizontally spaced from and aligned with one another and extending through and between said top and bottom ends of said stacked straw bales;
   (b) a plurality of vertical columns of rigid material disposed in and filling said aligned vertical channels of said stacked straw bales, each of said vertical columns of rigid material including
      (i) a vertical column of concrete filling each of said aligned vertical channels of said stacked straw bales, and
      (ii) a reinforcement rod having opposite upper and lower ends and disposed vertically in each of said vertical channels of said stacked straw bales and embedded by said concrete between said opposite upper and lower ends of said reinforcement rod;
   (c) means for supporting said stacked straw bales and said vertical columns of rigid material;
   (d) means for securing said stacked straw bales and said vertical columns of rigid material upon said supporting means; and (e) a layer of reinforced mortar supported along said vertical sides of said stacked straw bales forming an exterior surface of said wall assembly;

(f) said securing means including
  (i) a bottom board having opposite edge portions and mounted to said top end of a top one of said stacked straw bales and intersecting said aligned vertical channel of said top one stacked straw bale and defining an opening aligned with said aligned vertical channels of said stacked straw bales,
  (ii) a bridge,
  (iii) a pair of opposite side boards fixed along said opposite edge portions of said bottom board and supporting said bridge in spaced relation above said bottom board, and
  (iv) a body of concrete continuous with said vertical column of concrete of said vertical column of rigid material and substantially enclosed by said bottom board, bridge and opposite side boards.

23. The assembly of claim 22 wherein said supporting means includes a footing section of rigid material.

24. The wall assembly of claim 23 wherein said footing section includes a slab of concrete.

25. The wall assembly of claim 24 wherein said footing section further includes a stub rod having opposite upper and lower ends and disposed vertically in and embedded by said concrete of said vertical column and said concrete of said slab between said opposite upper and lower ends of said stub rod.

26. The wall assembly of claim 25 wherein:

said lower end of said reinforcement rod of said vertical column of rigid material has a hook-shaped configuration; and said upper end of said stub rod of said footing section of rigid material of said supporting means has a hook-shaped configuration corresponding to said lower end of said reinforcement rod of said vertical column of rigid material and such that said stub rod and said reinforcement rod are hooked to one another.

27. The wall assembly of claim 22 wherein said upper end of said reinforcement rod of said vertical column of rigid material extends through said body of concrete and said opening of said bottom board and is fastened to said bridge.

* * * * *